UNITED STATES PATENT OFFICE.

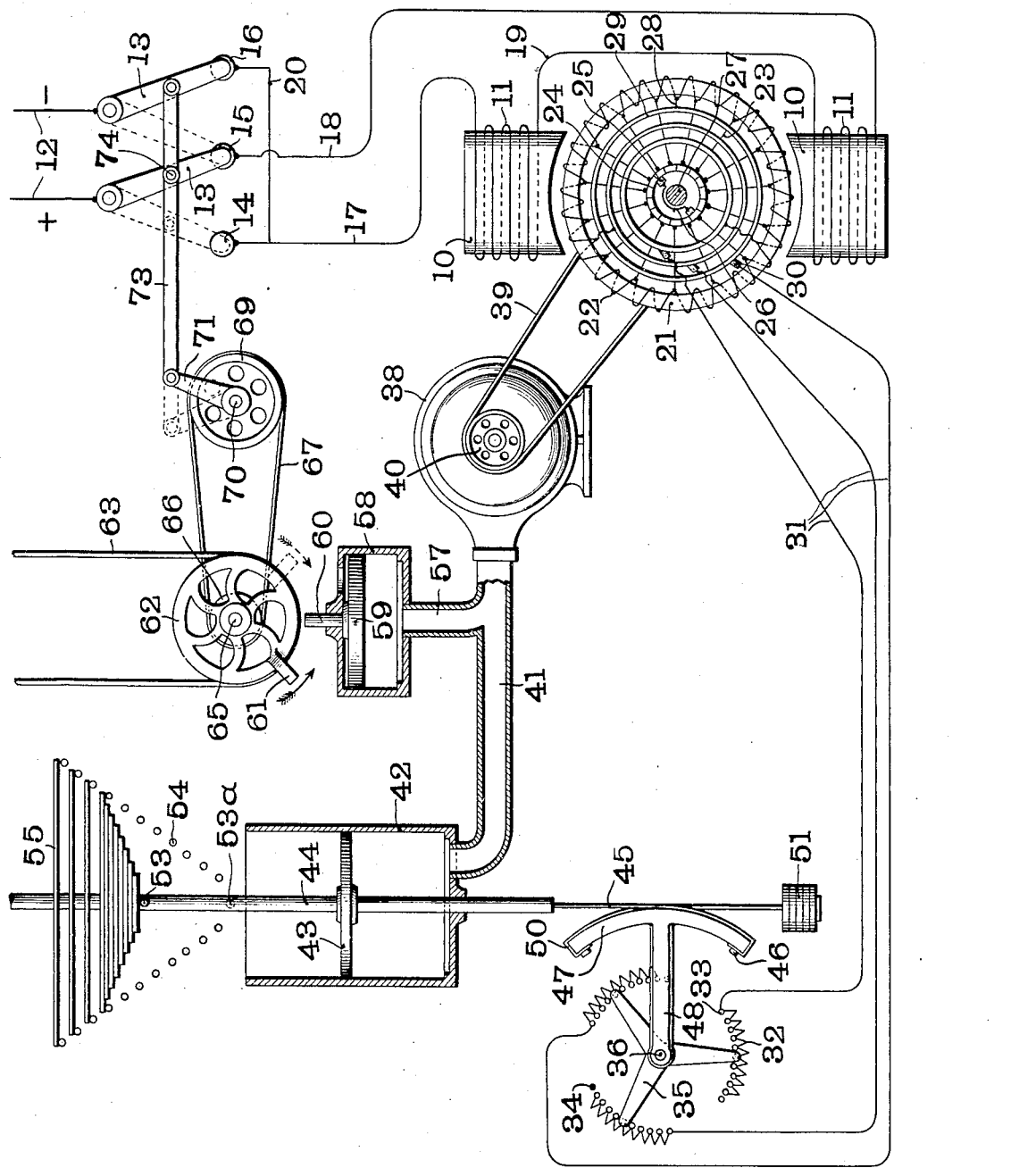

SIMON SPARROW, OF ST. LOUIS, MISSOURI, ASSIGNOR TO WAGNER ELECTRIC MANUFACTURING COMPANY, OF ST. LOUIS, MISSOURI.

ELECTRIC-MOTOR CONTROLLER.

No. 840,590.  Specification of Letters Patent.  Patented Jan. 8, 1907.

Application filed October 27, 1905. Serial No. 284,613.

*To all whom it may concern:*

Be it known that I, SIMON SPARROW, a citizen of the United States, residing at the city of St. Louis, State of Missouri, have invented a certain new and useful Electric-Motor Controller, of which the following is such a full, clear, and exact description as will enable any one skilled in the art to which it appertains to make and use the same, reference being had to the accompanying drawing, forming part of this specification.

My invention relates to automatic speed-controllers for electric motors, and more particularly to an automatic device for controlling the speed of alternating-current motors especially adapted for operating elevators and in which one of the motor members is provided with a plurality of locally-closed circuits having a variable resistance adapted to be included therein.

It also relates to means for controlling the reversing mechanism of such a motor to prevent the same from being reversed at improper times and to allow the reversing action to take place only when the motor-armature is substantially at rest.

Referring to the drawing, which shows one form in which my invention may be embodied, 10 indicates the field-cores of the motor, provided with the usual field-coils 11, supplied with current from the mains 12.

13 represents the two arms of a reversing-switch adapted to make contact with the plates 14, 15, and 16. From the plates 14 and 15 lead wires 17 and 18 to the field-coils 11, which are connected in series by the conductor 19.

20 is a wire connecting the plate 16 with the wire 17 to form the usual reversing-switch already well known in the art.

21 is the core of the motor-armature, provided with a continuous winding 22, which is connected, by means of leads 23, with a commutator 24, upon the segments of which bear brushes 25, connected together by a conductor 26.

27 is the armature-shaft.

The winding 22 is connected at three points 28 with three slip-rings 29, upon which bear three brushes 30, connected to the conductors 31, which lead to the three parts 32 of a suitable resistance. This resistance 32 is provided with contacts 33, connected thereto, and with three open-circuit contacts 34.

35 is a three-armed member pivoted at 36 so that the extremities of the arms will move over the contacts 33 and 34 in a well-known way to cut the resistance into and out of the circuit formed by the conductors 31.

38 is a blower or air-pump driven from the armature-shaft 26 by means of a belt 39, passing over a pulley 40 on the shaft of the blower. This blower in whichever direction it may turn is adapted to force a draft of air through the conduit 41. This conduit 41 leads to a cylinder 42, provided with a piston 43 and a piston-rod 44. The lower end of this piston-rod has connected to it a flexible strip of metal or other suitable material 45, the opposite end of which is fastened at 46 to the lower end of a segmental member 47, carried on a lever 48, rigidly attached to the member 35. 50 is a second similar flexible strip attached to the upper end of the member 47 and carrying a weight 51 at its lower end. The rod 44 is provided near its upper end with a pin 53. 54 represents other suitably-supported pins, which carry a series of weights 55. The conduit 41 is provided with a branch 57, leading to a cylinder 58, in which is the piston 59, provided with a piston-rod 60, which forms a stop engaging with a lug 61 on a wheel 62, around which passes a cord 63, which leads to the elevator-car. The wheel 62 is journaled on a shaft 65, which also rigidly carries a second wheel 66, over which passes a belt 67. This belt 67 passes over a wheel 69, carried upon a shaft 70. Upon this same shaft is also rigidly carried a lever 71, to which is connected a link 73, the opposite end of which is pivoted at 74 to the two arms 13 of the reversing-switch.

In the operation of my invention the motor is started in rotation in a given direction by throwing the arms 13 of the reversing-switch into contact with the plates 15 and 16 by manipulating the cord 63, the parts assuming the position shown in full lines in the drawing, as is well understood. When this is done, the arms of the member 35 rest upon the open-circuit contacts 34 of the resistance 32, thus opening the circuit through the conductors 31. The motor-armature will now start from rest, the current induced therein passing through the commutator 24, brushes 25, and conductor 26. The current of air generated by the blower 38 in the conduit 41 now becomes sufficient to raise the piston 59 in the cylinder 58 and place the stop 60 in the path of the lug 61 to effectually prevent the motor from being reversed by the operator. During this time the weight of the piston 43, piston-rod 44, and weight 51 is sufficient to hold the piston 43 in the bottom of the cylinder 42, so that the pin 53 will be in the position 53ª, (indicated in the dotted lines in the drawing,) all of the weights 55 resting on their respective pins 54; but as the speed of the motor increases the pressure of the piston 43 is sufficient to raise the same to such an extent that the arms of the member 35 will be shifted from the open-circuit contacts 34 to the next adjacent contacts 33, connected with the resistance 32, thus closing the circuit through the conductor 31 and allowing a certain amount of current to pass therethrough. At the same time the pin 53 is slightly raised into contact with the first of the weights 55 resting on its pins 54. Thus also a certain increase in speed is given the motor-armature, and the pressure on the piston 43 rising causes the pin 53 to lift the lowest of the weights 55 from its pins 54 and the arms of the member 35 to rotate farther over the contacts 33 to exclude some of the turns of the resistance 32 from the circuit through the conductors 31, thus permitting an additional current to flow through the conductors 31. From this follows a further increase in speed of the motor-armature and the steps above described are repeated, the pressure on the piston 43 rising and the pin 53 raising an additional weight 55 from its pins 54 and causing additional resistance to be excluded from the circuit through the conductors 31 until the motor-armature has reached its full normal running speed under load. In case it is desired to reverse the motor the wheel 62 is rotated, as indicated by the arrow in full lines in the drawing, until the lug 61 comes in contact with the stop 60. By means of the belt 67 the lever 71 is also simultaneously moved to the left and the arms 13 removed from the plates 15 and 16, thus breaking the circuit through the field-coils 11 of the motor and causing the motor-armature to come to rest, thus doing away with the pressure in the cylinders 42 and 58 and causing the pistons 43 and 59 to drop to the bottom of the cylinders 42 and 58 and restoring the arms of the member 35 to the open-circuit contacts 34. As soon as the stop 60 is withdrawn from the path of the lug 61 the wheel 62 may be rotated until the lug 61 assumes the position shown in dotted lines in the drawing, when the lever 71 will occupy the position also shown in dotted lines, causing the arms 13 of the reversing-switch to come in contact with the plates 14 and 15, sending the current in the opposite direction through the field-coils 11 of the motor, when the motor will start in the opposite direction and gradually increase in speed, as above described. It will be seen, however, that it is impossible to reverse the direction of the current through the motor field-coils 11 until the armature has come substantially to rest.

Having fully described my invention, what I claim as new, and desire to secure by Letters Patent of the United States, is—

1. The combination with a motor, of reversing means therefor, and an automatic stop for said reversing means controlled by the rotation of said motor.

2. The combination with a motor, of a fluid-pressure generator driven by said motor, reversing means for said motor, and a stop for said reversing means controlled by said fluid-pressure generator.

3. The combination with an electric motor, of a resistance therefor, a fluid-pressure generator driven by said motor, means actuated by said fluid-pressure generator for varying said resistance, reversing means for said motor, and a stop for said reversing means controlled by said fluid-pressure generator.

4. The combination with an electric motor, of a resistance therefor, an air-pump driven by said motor, a cylinder connected with said pump, a piston in said cylinder, means connected with said piston for varying said resistance, a reversing-switch for said motor, a second cylinder connected with said pump, a second piston in said second cylinder, and a stop for said reversing-switch actuated by said second piston.

5. The combination with a motor, of a pressure-reservoir provided with a movable member, means driven by said motor for supplying fluid-pressure to said reservoir to actuate said movable member, a plurality of independent weights progressively opposed to the movement of said member, a resistance for said motor, and means connected with said member for varying said resistance.

6. The combination with a motor, of a cylinder, a piston in said cylinder, means actuated by said motor for supplying fluid-pressure to said cylinder to actuate said piston, a progressively-increasing weight opposing the movement of said piston, a resistance for said motor, means connected with said piston for varying said resistance, reversing means for said motor, a stop for said reversing means, and means controlled by said fluid-pressure for operating said stop.

7. The combination with the armature of an alternating-current motor, of a locally-closed circuit therefor, a second locally-closed circuit for said armature embodying a variable resistance, a pressure-reservoir comprising a movable member, a fluid-pressure generator driven by said armature and connected with said reservoir to supply fluid-pressure thereto, a progressively-increasing weight opposing the movement of said movable member, and means connected with said movable member for varying said resistance.

8. The combination with the armature of an alternating-current motor, of a locally-closed circuit therefor comprising a variable resistance, an air-pump driven from said armature, a cylinder, a conduit connecting said air-pump and cylinder, a piston in said cylinder, a progressively-increasing weight opposing the movement of said piston, means connected with said piston for varying said resistance, a second conduit leading from said pump, a second cylinder connected to said conduit, a second piston in said second cylinder, reversing means for said motor, and a stop for said reversing means actuated by said second piston.

In testimony whereof I have hereunto set my hand and affixed my seal in the presence of the two subscribing witnesses.

SIMON SPARROW. [L. S.]

Witnesses:
J. H. KEEBAUGH,
JAMES H. BRYSON.